United States Patent [19]

Surkamp et al.

[11] Patent Number: 4,730,642

[45] Date of Patent: Mar. 15, 1988

[54] SHAFT CONTROL MECHANISM OF A WEAVING MACHINE

[75] Inventors: Paul Surkamp, Kempen; Ferdinand Szücs, Willich, both of Fed. Rep. of Germany

[73] Assignee: Johann Kaiser GmbH & Co., KG, Bayreuth, Fed. Rep. of Germany

[21] Appl. No.: 892,597

[22] Filed: Aug. 1, 1986

[30] Foreign Application Priority Data

Aug. 8, 1985 [DE] Fed. Rep. of Germany ....... 3528504

[51] Int. Cl.[4] .............................................. D03C 1/00
[52] U.S. Cl. ..................................................... 139/76
[58] Field of Search .................................. 139/76, 66 R

[56] References Cited

U.S. PATENT DOCUMENTS

| 4,404,993 | 9/1983 | Jülich et al. | 139/76 |
| 4,493,346 | 1/1985 | Speich | 139/76 |
| 4,542,769 | 9/1985 | Jülich | 139/76 |
| 4,646,788 | 3/1987 | Brock et al. | 139/66 R |

FOREIGN PATENT DOCUMENTS

| 2741199 | 2/1979 | Fed. Rep. of Germany | 139/76 |
| 3414639 | 10/1985 | Fed. Rep. of Germany | 139/76 |
| 43141 | 1/1960 | Poland | 139/66 R |

Primary Examiner—Harvey C. Hornsby
Assistant Examiner—Joseph S. Machoga
Attorney, Agent, or Firm—Herbert L. Lerner; Laurence A. Greenberg

[57] ABSTRACT

A shaft control mechanism for controlling a shaft of a weaving machine according to a pattern includes a connecting rod operatively connected to the shaft, a drive element intermittently rotating and standing still in a dead center position, an eccentric disc rotatably supported on the connecting rod, a coupling element connected to the eccentric disc, a device for moving the coupling element into a recess formed in the drive element interconnecting the drive element and the eccentric disc in a coupled position, a controllable locking element securing the coupling element against movement out of said recess into an uncoupled position until the drive element reaches the dead center position along with the eccentric disc, and at least one control element transmitting an external force to the coupling element according to the pattern, required to move the coupling element into the uncoupled position while the drive element and the eccentric disc are rotating.

3 Claims, 6 Drawing Figures

SHAFT CONTROL MECHANISM OF A WEAVING MACHINE

The invention relates to a shaft control mechanism of a weaving machine, including an intermittently rotating drive element having a recess in which a coupling element connected to an eccentric disc can be engaged for connecting the intermittently rotating drive element with the eccentric disc, the eccentric disc being rotatably supported in a connecting rod which is operatively connected to the shaft.

In shaft control mechanisms, the coupling element is activated if either the drive element and the eccentric disc have not yet stopped, or the force required for disengagement is applied to the coupling element from the outside when the drive element and the eccentric disc have stopped.

Both methods have disadvantages and limit the control shaft speed, either due to long stand-still periods, or due to the increasing danger of control errors at increasing speed.

It is accordingly an object of the invention to provide a shaft control mechanism of a weaving machine, which overcomes the hereinafore-mentioned disadvantages of the heretofore-known devices of this general type and which permits great control speed with little chance of control errors occurring.

With the foregoing and other objects in view there is provided, in accordance with the invention, a shaft control mechanism for controlling a shaft of a weaving machine according to a pattern, comprising a connecting rod operatively connected to the shaft, a drive element intermittently rotating and standing still in a dead center position, an eccentric disc rotatably supported on the connecting rod, a coupling element connected to the eccentric disc, means for moving the coupling element into a recess formed in the drive element interconnecting the drive element and the eccentric disc in a coupled position, a controllable locking element securing the coupling element against movement out of the recess into an uncoupled position until the drive element reaches the dead center position along with the eccentric disc, and at least one control element transmitting an external force to the coupling element according to the pattern required to move the coupling element into the uncoupled position while the drive element and the eccentric disc are rotating.

During shifting from the low-shed position to the high-shed position, or vice versa, the shifting and the outside force required for disengagement can be applied to the coupling element long before the dead center or zero position or a stand-still is reached. When the dead center position or stand-still of the drive element and the eccentric disc is reached, only the controllable locking element is shifted, with very little force being required, which releases the coupling element that has been arrested up to this point and is now disengaged without any additional force, over a very short time. Accordingly friction and therefore great wear, do not accompany disengagement. It is also not necessary to wait until the mechanism is fully stopped in order to avoid wear, and it is not necessary to apply the external force to the coupling element for shifting only at that point, which would not only increase the time required for the shifting operation, but would also result in producing wear at some other parts. Furthermore, in this case the dead center position could not be passed without stopping.

In the mechanism according to the invention, it is also not necessary to apply the force required for shifting in a sudden manner, but the force can instead be applied smoothly, which results in a less noisy operation.

In accordance with another feature of the invention, the control element also controls the locking element. In this way, not only is the correct sequence of releasing the locking and disengagement assured, but the time required for the shifting operation is also limited to a minimum.

In accordance with a further feature of the invention, the coupling element has a tooth gap formed therein and the control element has a shifting tooth formed thereon matching the tooth gap and being movable into the tooth gap only when the eccentric disc is in the dead center position, and including a control extension projecting into the tooth gap and being moved by the shifting tooth as the shifting tooth enters the tooth gap for releasing the locking element. The shifting tooth and the tooth gap are form-locked by their mutual shapes.

In accordance with an added feature of the invention, there is provided a stop on the eccentric disc, the locking element being in the form of a spring-loaded pawl having a foot, the pawl being pivoted on the coupling element into a locked position in which the foot bears against the stop and being pivoted away from the stop by the control extension.

In accordance with a concomitant feature of the invention, the locking element is in the form of a spring-loaded pawl pivoted on the eccentric disc, the pawl having a nose bearing against the coupling element, and the control extension has an inclination being contacted by the shifting tooth for moving the nose as the shifting tooth enters the tooth gap.

Other features which are considered as characteristic for the invention are set forth in the appended claims.

Although the invention is illustrated and described herein as embodied in a shaft control mechanism of a weaving machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
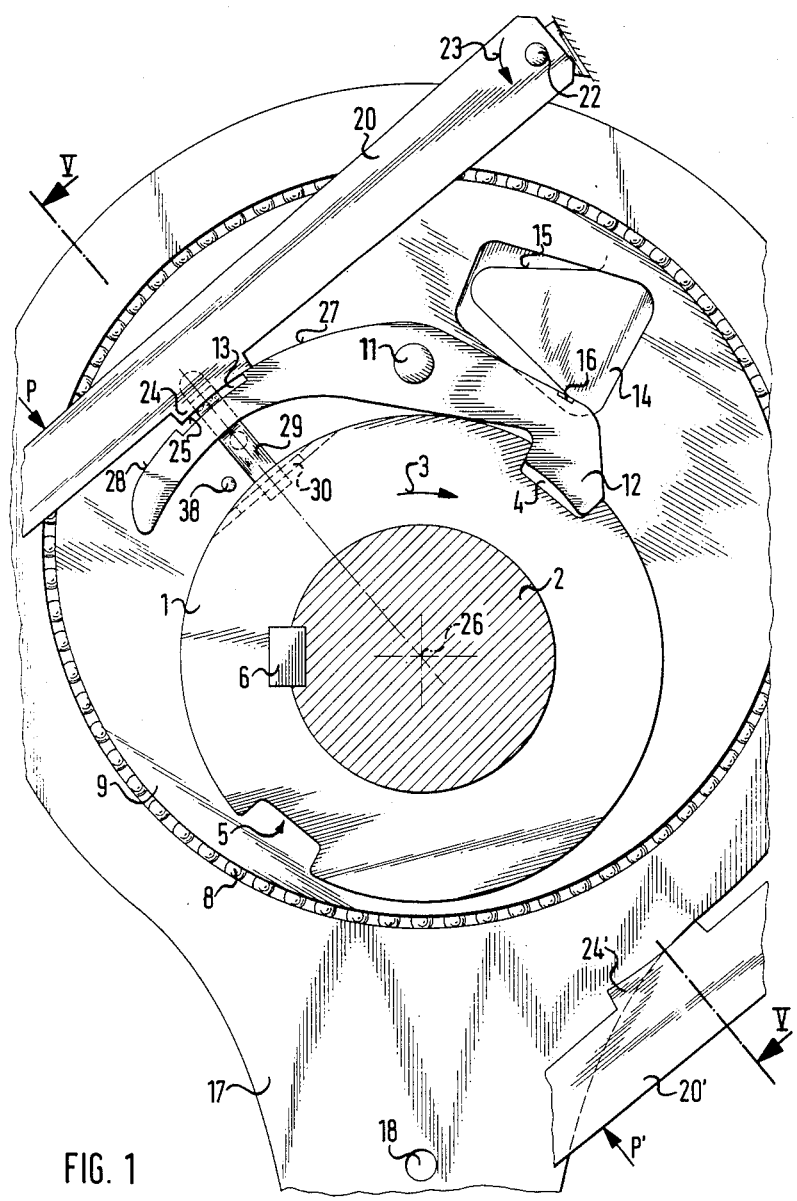
FIG. 1 is a fragmentary, diagrammatic, top-plan view of a first embodiment of a shaft control mechanism in the engaged or coupled state.
Figure 2:
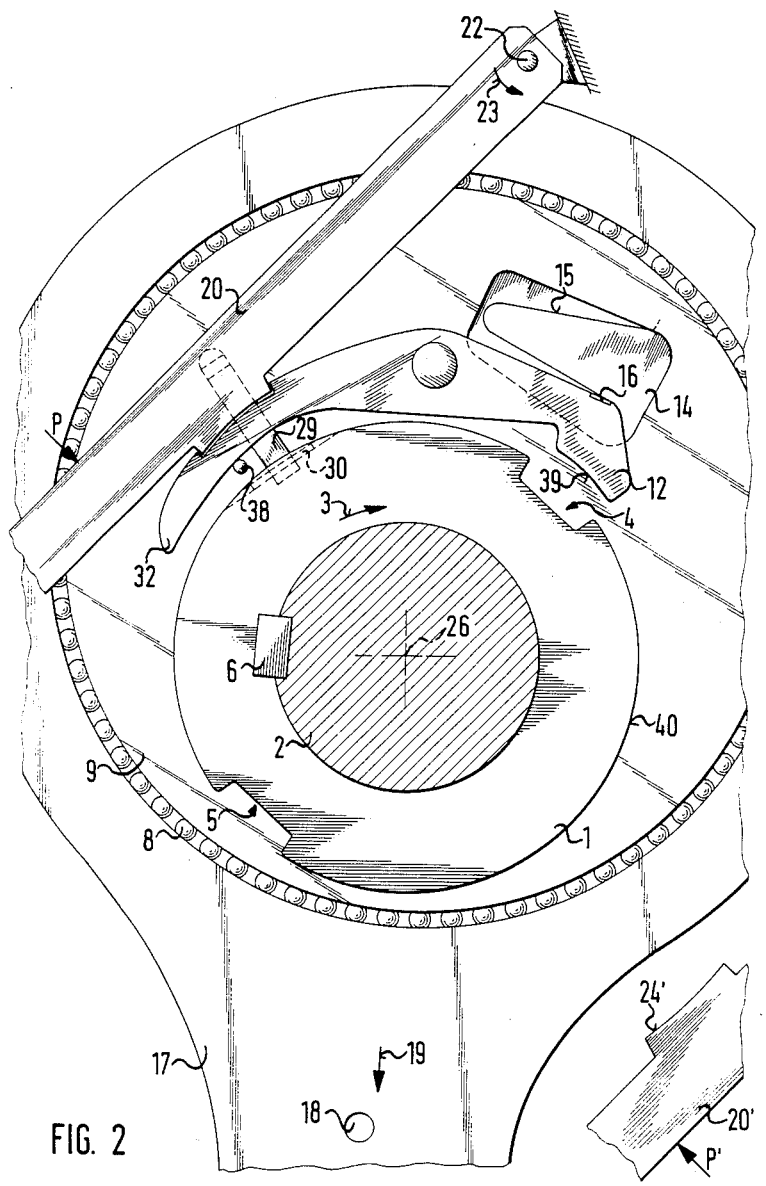
FIG. 2 is a view similar to FIG. 1 of the same shaft control mechanism in the disengaged or uncoupled state.
Figure 5:
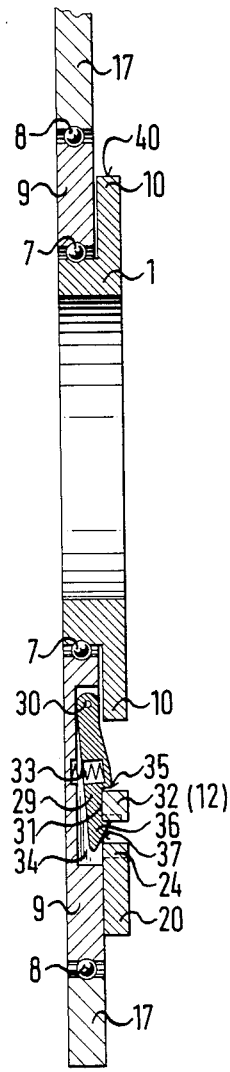
FIG. 5 is a fragmentary, cross-sectional view taken along the line V—V in FIG. 1, in the direction of the arrows.

Referring now to the figures of the drawings in detail and first, particularly, to FIGS. 1, 2 and 5 thereof, there is seen a first embodiment of a shaft control mechanism, including an annular drive element 1 fixed to a shaft 2, which can intermittently rotate through 180 degrees in the direction of an arrow 3, with the aid of a non-illustrated driving device. After each rotation through 180 degrees, the shaft stops for a short time at a dead-point or dead-center position and then rotates through 180 degrees again. The drive element 1 has two oppositely-positioned recesses 4 and 5 formed therein. A wedge or key 6 interconnects the shaft 2 and the drive element 1.

FIG. 5 shows in particular that an eccentric disc 9 is rotatably mounted on the drive element 1 with the aid of a ball bearing 7. It is also seen that a rim 10 of the drive element 1 partly overlaps the eccentric disc 9. The above-mentioned recesses 4 and 5 are disposed in the rim 10 of the drive element 1.

The eccentric disc 9 is provided with a pin 11 on which a coupling element 12 is pivotally supported. The coupling element 12 is somewhat similar to a pawl and it fits into the recesses 4 and 5. The coupling element 12 forms one end of a two-armed lever, while the other end is provided with a tooth gap 13, which is open toward the outside. The eccentric disc 9 has a recess 14 formed therein, in which a bent leaf spring 15 is disposed, with a bentup end 16 loading the coupling element 12 in such a way that the coupling element 12 can engage one of the two recesses 4 or 5.

In the engaged or coupled state, the coupling element 12 connects the intermittently rotating drive element 1 with the eccentric disc 9. With the aid of an additional ball bearing 8, the eccentric disc 9 is rotatably supported in a connecting rod 17. If the coupling element 12 is engaged, the rotation of the drive element 1 through 180 degrees in the direction of the arrow 3 moves a joint or fulcrum 18 of the connecting rod 17 parallel to the direction of an arrow 19 in FIG. 2 by a distance corresponding to the eccentricity of the eccentric disc 9. The fulcrum 18 is connected by a non-illustrated linkage to a shaft of a heald or dobby machine or a metal heald frame of a weaving machine, so that the heald machine or heald frame can be brought from a high-shed position to a low-shed position after the drive element 1 has rotated through 180 degrees. The drive element 1, the eccentric disc 9, the connecting rod 17 and the fulcrum 18 are therefore at the dead-point position, and the forces acting at the fulcrum 18 are directed toward a central axis 26 of the shaft 2 or are directed away from the central axis 26 of the shaft 2. In order to shift the coupling element 12, a control or shifting element 20 is provided which can be controlled according to a pattern. The control element 20 is constructed as a lever, which swings about a pivot point 22 according to the pattern and is therefore loaded by a force P. According to the pattern, the lever 20 can also be unloaded and pivot about the pivot point 22 against the direction of an arrow 23.

The control element or lever 20 is provided with a shifting tooth 24, which matches and fits the tooth gap 13 of the coupling element 12. The end of the shifting tooth 24 has a gliding surface 25, which is concentric to the central axis 26 of the shaft 2. In the position shown in FIG. 1, the gliding surface 25 lies on a gliding surface 27 of the second lever arm of the lever having the coupling element 12, which also is concentric to the central axis of the shaft 2. The second lever arm of the coupling element 12 has an additional gliding surface 28, which is also concentric to the central axis 26 of the shaft 2 and matches the gliding surface 25 of the control element 20.

While making reference to FIG. 1, it will be assumed that the shaft 2 and therefore the drive element 1 as well, are moving in the direction of the arrow 3, and will reach the dead-point position and come to a stop if they continue to rotate about 5 degrees. According to the pattern, the control element 20 is loaded by the force P, so that the force P which is required for disengagement effected from the outside, is transferred to the coupling element 12 by the pressure of the gliding surface 25 against the gliding surface 27.

It is therefore ensured that although the force P is applied while the drive element and the eccentric disc are moving, the coupling element 12 can only move from the engaged position shown in FIG. 1 to the disengaged position shown in FIG. 2, in the dead-point position of the intermittently rotating drive element 1 and the eccentric disc 9, and a locking element 29 secures the coupling element 12 against any motion and position change which would cause it to leave the engaged position, until the drive element 1 and the eccentric disc 9 are in the dead-point or dead-center position.

FIG. 5 shows in particular that the locking element 29 is constructed in the form of a pawl. The pawl 29 is pivotally supported on the eccentric disc 9 by a pin 30. The pawl 29 has a notch 31 formed therein in which a second lever arm 32 of the lever having the coupling element 12 is engaged, due to the action of a spring 33, as shown in the locking position in FIG. 5. Since the pawl 29 is disposed in a recess 34 formed in the eccentric disc 9, it can be controlled in such a way that it is moved against the force of the spring 33 into the recess 34 in order to release the lever arm 32 and the coupling element 12.

In the locked position shown in FIG. 5, a nose or projection 35 which borders the recess 31, prevents motion of the lever arm 32 which would cause the disengagement of the coupling element 12. The other side of the recess 31 is bordered by a control extension 36 with a rising inclination 37.

If the stand-still zero position or dead-point position is reached, the shifting tooth 24 slides into the tooth gap 13 and pushes the inclination 37, which moves out of the way and thus unlocks the locking element 29.

It is only in this condition that the shifting tooth 24 of the control element 20 can completely enter into the tooth gap 13 and pivot the lever about the pin 11 counter-clockwise, in order to disengage the coupling element 12.

FIG. 2 shows the coupling element 12 in the disengaged state and it shows the control element 20 which is loaded by the force P, in a position wherein it is moved counter-clockwise as far as possible about the pivot point 22. The control element 20 cannot swing further, because the second lever arm 32 of the lever having the coupling element 12 lies against a stop pin 38, which is connected to the eccentric disc 9. The high-shed position which has thus been reached is maintained, because the eccentric disc 9 is not taken along during the continued motion of the drive element 1.

In any case, in order to avoid a situation in which the eccentric disc is not taken along, the dead-point position or the high-shed or low-shed position can be secured by a spring-loaded detent, such as a non-illustrated ball detent. Such a device for maintaining a position can be provided between the eccentric disc 9 and the connecting rod 17, for instance, or between the connecting rod 17 and a part which is fixed to the machine frame. Such a position detent can also be provided at the heald machine or dobby linkage or at the heald frame, in the form of a snap-in device.

If the coupling element 12 is to be disengaged again from the position shown in FIG. 1, this is accomplished by moving back the control element 20 clockwise against the action of the force P according to the pattern, while the drive element 1 is still in motion. Due to the action of the leaf spring 15, a sliding surface 39 of the coupling element 12 is moved against an edge 40 of the drive element 1. When the drive element 1 reaches the dead-point position or the stand-still zero position, the coupling element 12 engages one of the two recesses 4 or 5, so that the position is automatically secured by the locking element 29.

In order to carry out the change-over, another control element 20' with a shifting tooth 24' is provided opposite the control element 20. Non-illustrated parallel linkages ensure that both control elements or levers 20 and 20' are always mutually parallel and operate simultaneously and in the same sense. The control element 20' is loaded by a force P'.

Figure 6:
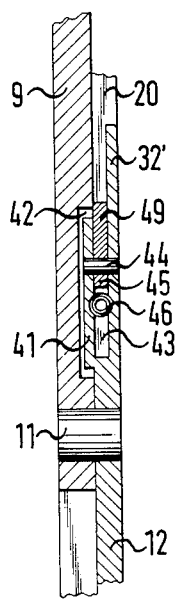
FIG. 6 is a fragmentary, cross-sectional view taken along the line VI—VI in FIG. 4, in the direction of the arrows.

The second embodiment of the invention according to FIGS. 3, 4 and 6, differs from the first embodiment, as will be explained below.

A second lever arm 32' of the lever having the coupling element 12, has an extension 41 projecting into a depression 42 formed in the eccentric disc 9. According to FIG. 6, a slot is formed between the extension 41 and the lever arm 32', in which a locking element 45 is pivotally supported on a pin 44. The locking element 45 is constructed as a pawl which is loaded by spring 46. As shown in FIG. 3, the pawl has a foot 47 which bears against a stop 48 on the eccentric disc 9, in the locked position. The locking element or pawl 45 has a control extension 49 which projects in front of a tooth gap 13' in the lever arm 32'. The extension 49 obstructs the path of the shifting tooth 24 of the control element 20, if the shifting tooth tries to enter the tooth gap 13'.

Figure 3:
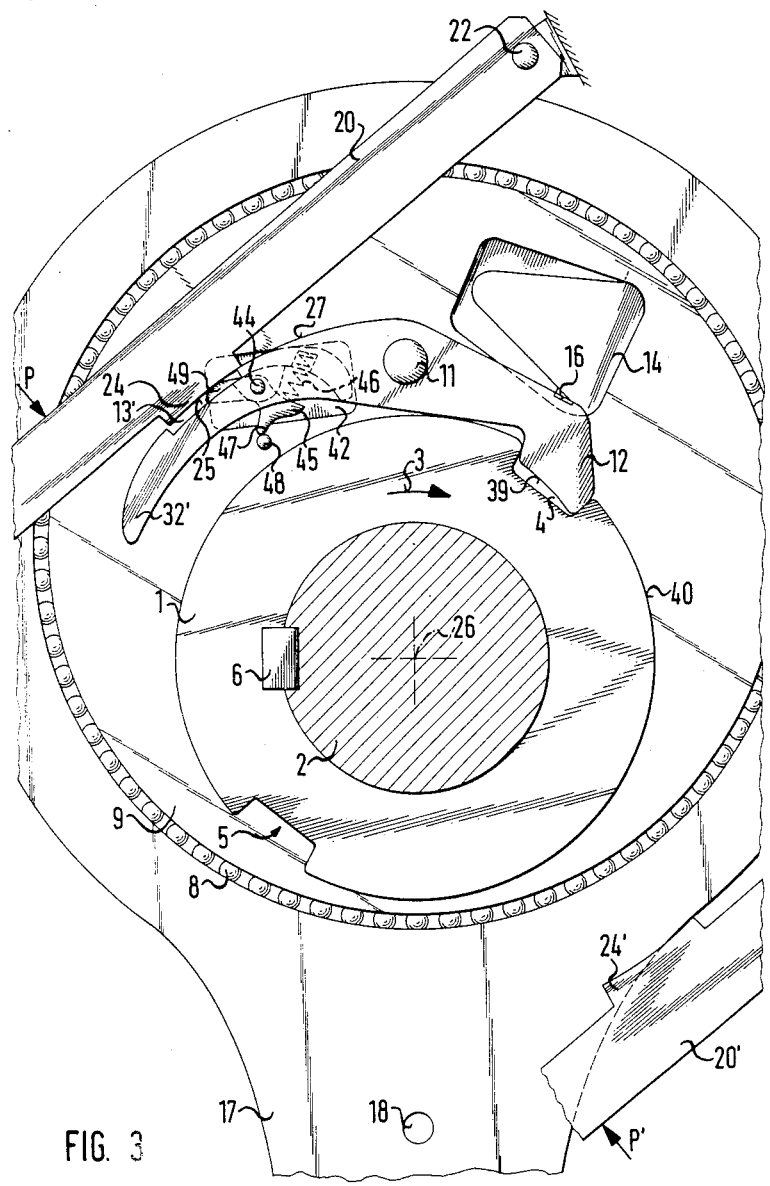
FIG. 3 is a view similar to FIG. 1 of a second embodiment of a shaft control mechanism in the engaged or coupled state.
Figure 4:
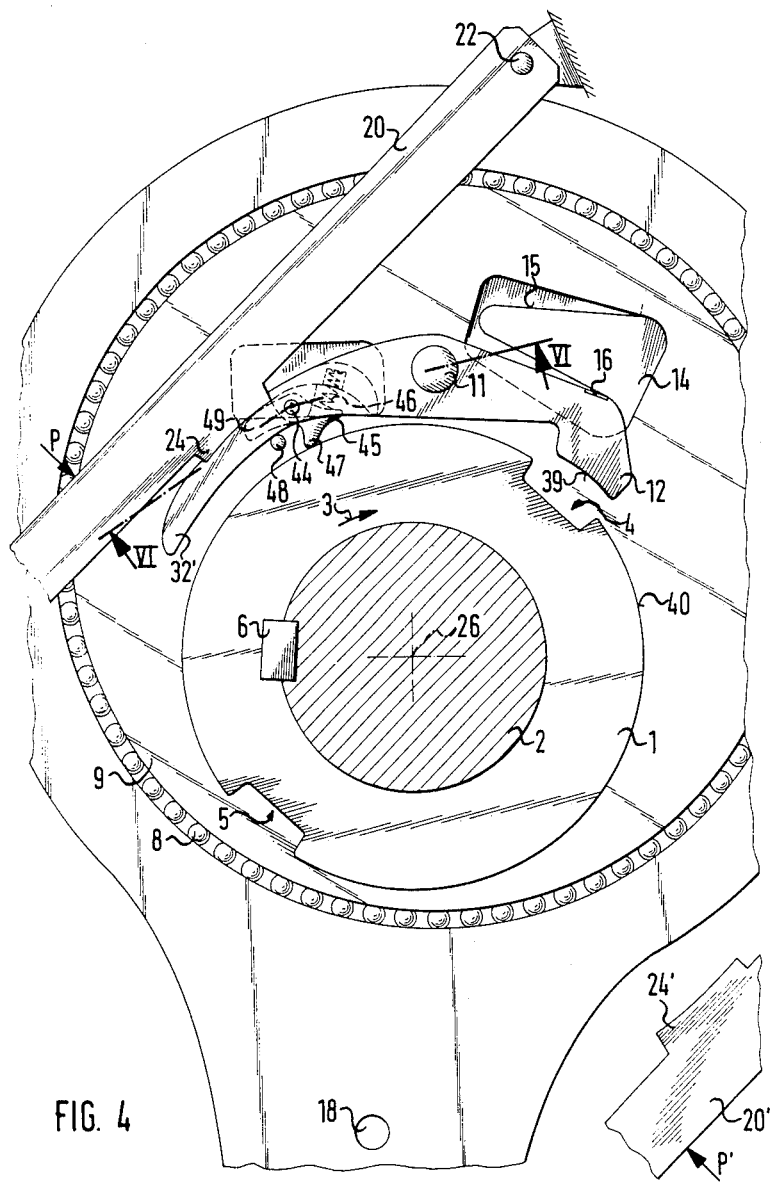
FIG. 4 is a view similar to FIG. 3 of the shaft control mechanism thereof in the disengaged or uncoupled state.

According to FIG. 3, the drive element 1 is still moving in the direction of the curved arrow 3, while the coupling element 12 is engaged, and the engaged position is secured by the locking element 45. The gliding surface 25 of the shifting tooth 24 slides on the gliding surface 27 of the lever arm 32'. The fulcrum 18 has not yet completely reached the high-shed position. This will be the case when the drive element 1 has advanced about 5 degrees further. At that point, the shifting tooth 24 loses contact with gliding surface 27 and loads the control extension 49 under the action of the force P, so that the locking element 45 must pivot about a pin 44 and the foot 47 loses contact with the stop 48, thus releasing the locking of the coupling element 12. It is only at that point that the control element 20 can move the second lever arm 32', until it hits the stop 48, as shown in FIG. 4.

The high-shed position is therefore reached and is maintained as long as the coupling element 12 remains disengaged.

If the device is to be engaged again, the control element 20 is pivoted back clockwise about the pivot point 22 according to the pattern, so that the sliding surface 39 of the coupling element 12 can be disposed against the edge 40 of the rotating drive element 1, until the coupling element 12 engages one of the two recesses 4 or 5 due to the action of the leaf spring 15 at the next dead-point position or stand-still zero position of the drive element 1. If the drive element 1 subsequently moves in the direction of the arrow 3 again, the eccentric disc 9 along with the connecting rod 17 are taken along, so that the low-shed position is reached.

In the second embodiment, similar to the first embodiment, another control element 20' operating in parallel and having another shifting tooth 24', is provided.

It should also be mentioned that the invention also permits left hand operation against the direction of the arrow 3, as well as right hand operation in the direction of the curved arrow 3. The invention is not limited to the illustrated and described embodiments which were used as examples.

We claim:

1. Shaft control mechanism for controlling a shaft of a weaving machine according to a pattern, comprising a connecting rod operatively connected to the shaft, a drive element intermittently rotating and standing still in a dead center position, an eccentric disc rotatably supported on said connecting rod, a coupling element connected to said eccentric disc, means for moving said coupling element into a recess formed in said drive element interconnecting said drive element and said eccentric disc in a coupled position, a controllable locking element securing said coupling element against movement out of said recess into an uncoupled position until said drive element reaches said dead center position along with said eccentric disc, at least one control element controlling said locking element and transmitting an external force to said coupling element according to the pattern while said drive element and said eccentric disc are rotating, said external force being required to move said coupling element into said uncoupled position when said dead center position of said drive element and said eccentric disc are reached, said coupling element having a tooth gap formed therein, said control element having a shifting tooth formed thereon matching said tooth gap and being movable into said tooth gap only when said eccentric disc is in said dead center position, said locking element including a control extension projecting into said tooth gap and being moved by said shifting tooth as said shifting tooth enters said tooth gap for releasing said locking element.

2. Shaft control mechanism according to claim 1, wherein said locking element being in the form of a spring-loaded pawl pivotal on said eccentric disc, said pawl having a nose bearing against said coupling element, and said control extension having an inclination being contacted by said shifting tooth for moving said nose as said shifting tooth enters said tooth gap.

3. Shaft control mechanism according to claim 1, including a stop disposed on said eccentric disc, said locking element being in the form of a spring-loaded pawl having a foot, said pawl being pivotal on said coupling element into a locked position in which said foot bears against said stop and being pivotal away from said stop by said control extension.

* * * * *